United States Patent
Valentine et al.

(10) Patent No.: US 6,775,243 B1
(45) Date of Patent: Aug. 10, 2004

(54) GRAPHICALLY DISTINGUISHING A PATH BETWEEN TWO POINTS ON A NETWORK

(75) Inventors: Simon Peter Valentine, Hemel Hempstead (GB); Lee Anthony Walker, Watford (GB); Christopher Robert Linzell, St Albans (GB)

(73) Assignee: 3Com Corporation, Santa Clara, CA (US)

(*) Notice: Subject to any disclaimer, the term of this patent is extended or adjusted under 35 U.S.C. 154(b) by 792 days.

(21) Appl. No.: 09/662,536

(22) Filed: Sep. 15, 2000

(30) Foreign Application Priority Data

Apr. 13, 2000 (GB) .............................................. 0009120

(51) Int. Cl.⁷ .............................................. H04L 12/28
(52) U.S. Cl. ..................................... 370/255; 709/224
(58) Field of Search ................................ 370/254, 255, 370/257, 258; 709/223, 224

(56) References Cited

U.S. PATENT DOCUMENTS

| | | | |
|---|---|---|---|
| 5,768,552 A | * 6/1998 | Jacoby | 345/441 |
| 5,966,128 A | * 10/1999 | Savage et al. | 345/853 |
| 6,137,782 A | * 10/2000 | Sharon et al. | 370/255 |
| 6,347,336 B1 | * 2/2002 | Song et al. | 709/223 |
| 6,396,810 B1 | * 5/2002 | Hebel | 370/248 |
| 6,633,943 B1 | * 10/2003 | James et al. | 710/306 |

FOREIGN PATENT DOCUMENTS

| | | |
|---|---|---|
| EP | 0 412 692 A1 | 2/1991 |
| WO | WO 96/32792 | 10/1996 |

* cited by examiner

Primary Examiner—Hassan Kizou
Assistant Examiner—Dmitry Levitan
(74) Attorney, Agent, or Firm—Michaelson & Associates; Peter L. Michaelson; Alberta A. Vitale

(57) ABSTRACT

In a computer network, a method to graphically distinguish on a network map a path between two points on a network. This is particularly useful in diagnosing problems, by tracing a path between two devices. While path tracing may be a relatively simple matter where there are relatively few devices, in a complex network, the paths between two devices will not be immediately obvious and indeed it is desirable to be able to ascertain whether there is more than one such path.

There is disclosed a method for selecting a path or paths between two selected points in a network, said network comprising a plurality of points interconnected by links, comprising the steps of deleting from the method all points other than the selected two points having a single link to the remainder of the network to produce a reduced network, and repeating the deletion step until there are no points, other than the two selected points, which are connected to the remaining network by a single link.

A computer program for carrying out the method is described.

12 Claims, 6 Drawing Sheets

GRAPHICALLY DISTINGUISHING A PATH BETWEEN TWO POINTS ON A NETWORK

BACKGROUND OF THE INVENTION

The present invention relates to monitoring a network, such as a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), wide area network (WAN) or other types and may operate in accordance with any desired protocol.

After such a network has been installed, it is desirable for the person appointed network manager to be able to understand the technical operation of the network. In known network management systems, the manner in which the relevant data is retrieved from the managed devices, compiled and displayed has been problematic in several respects. The data received from each of the managed devices is often simply compiled and displayed as a list of data for the user to interpret.

It is known to provide automatic interrogation ("discovery") of the network to produce a map of the topology of the network which may be displayed on a visual display unit showing the devices and links between the devices. At its simplest, and where the device is a "managed" device, this is usually provided by interrogation using a known protocol, such as the SNMP (Simple Network Management Protocol) protocol, of the so-called 'agent' of each device which stores the devices unique MAC address, the type of device and the MAC (Media Access Control) addresses the devices which are connected to the ports directly or indirectly.

It is desirable in this supervising capacity to be able to graphically distinguish on the network map a path between two points on a network. This is particularly useful in diagnosing problems, by tracing a path between two devices. Whilst path tracing may be a relatively simple matter where there are relatively few devices, in a complex network, the paths between two devices will not be immediately obvious and indeed it is desirable to be able to ascertain whether there is more than one such path.

SUMMARY OF THE INVENTION

The present invention provides a method for selecting a path or paths between two selected points in a network, said network comprising a plurality of points interconnected by links, comprising the steps of deleting from the method all points other than the selected two points having a single link to the remainder of the network to produce a reduced network, and repeating the deletion step until there are no points, other than the two selected points, which are connected to the remainder network by a single link.

The present invention also provides a computer program for carrying out the method of the preceding paragraph.

The present invention also provides apparatus for selecting a path or paths between two selected points in a network, said network comprising a plurality of points interconnected by links, comprising the means to delete from the selection process all points other than the selected two points having a single link to the remainder of the network to produce a reduced network, and to repeat the deletion step until there are no points, other than the two selected points, which are connected to the remainder network by a single link.

BRIEF DESCRIPTION OF THE DRAWINGS

Preferred embodiments of the invention will now be described by way of example only with reference to the accompanying drawings in which.

DESCRIPTION OF THE PREFERRED EMBODIMENTS

Figure 1:
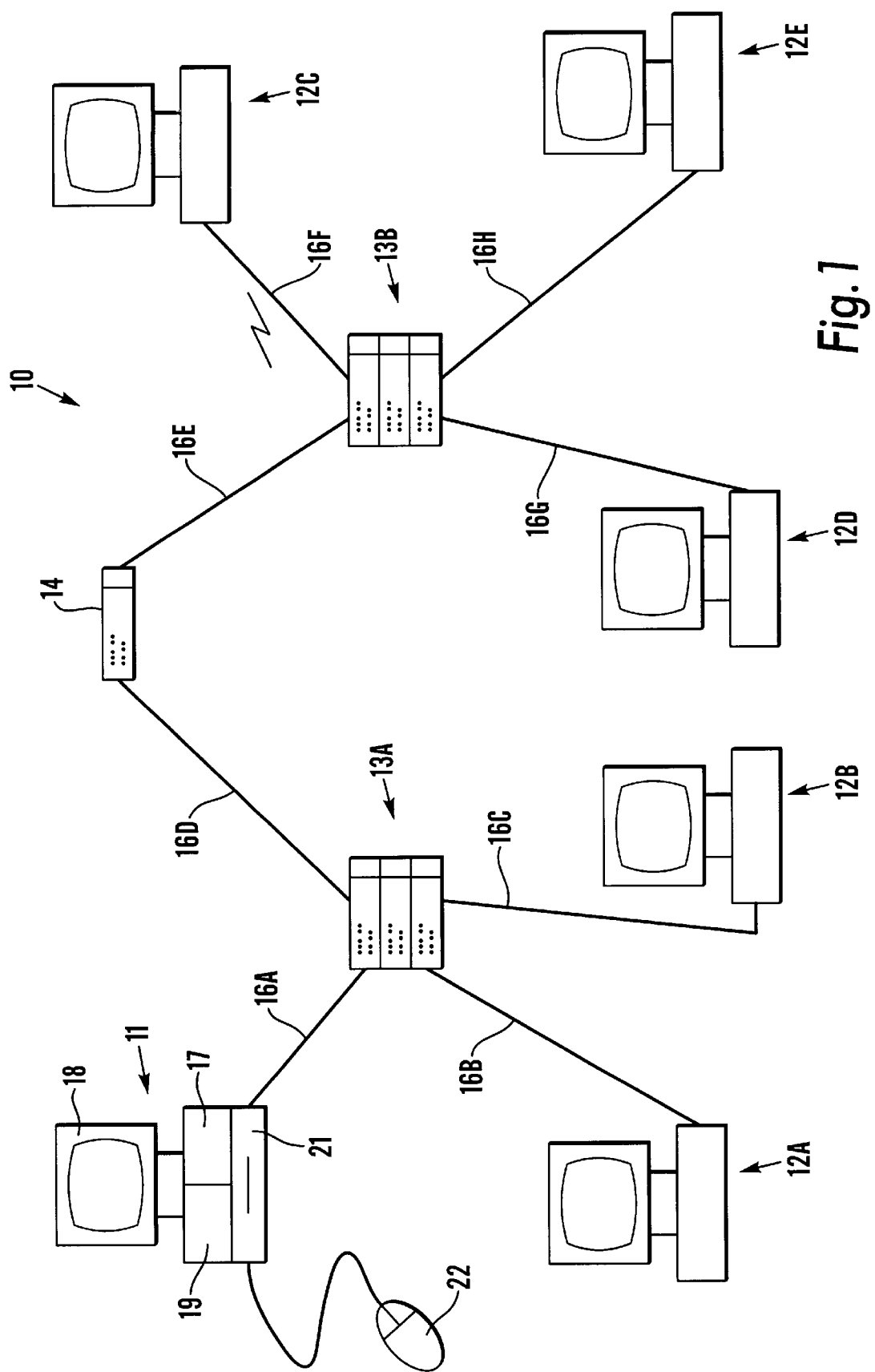
FIG. 1 is a diagrammatic view of a network incorporating a preferred embodiment of the invention.

Referring to FIG. 1 there is shown a network 10 comprising a plurality of devices in the form of a network supervisor's workstation or computer 11, other workstations 12B–E, hubs 13A, 13B, and switch 14. The network is a simple network and is set out for purposes of illustration only. Other configurations and arrangements, may be used.

The devices are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD (compact disc) drive, a floppy disk drive or a zip drive, and a memory 17 (which may be local to the supervisor's workstation or elsewhere and accessible, for example, over the network) for storing a program which may have been loaded from the program store 21 or downloaded for example via Internet from a website.

Figure 2:
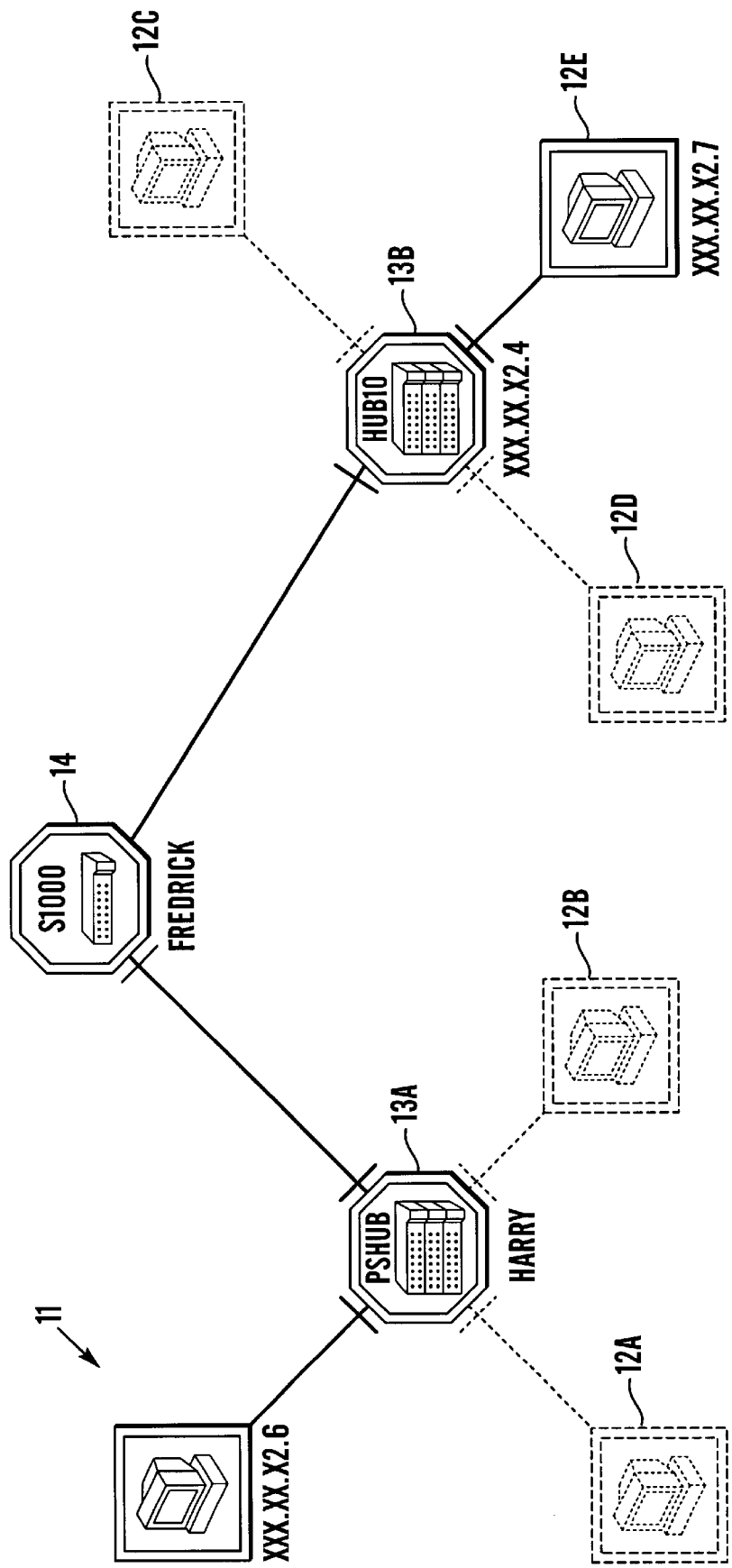
FIG. 2 is a view of one display provided on a visual display apparatus of the network of FIG. 1.
Figure 3:
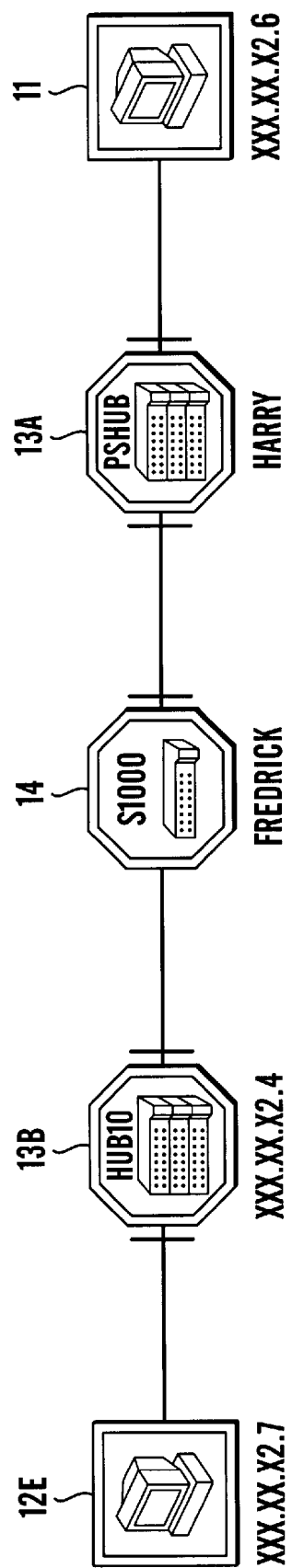
FIG. 3 is a view of an alternative display to that shown in FIG. 2, FIG. 4 sets out the program steps in accordance with the preferred embodiment of the invention.

FIGS. 2 and 3 show different visual displays (network maps) which are displayed on the visual display unit 18 of the network supervisor.

The network supervisor's computer 11 may "discover" the network, i.e. find out how the devices are connected to one another. and their identity by interrogating and analysing the network, and store in the memory 17 the information relating to the devices within the network and the links between the devices. In essence, most quality devices include an "agent" which stores information about the device such as its unique MAC. number, its ID (identifier) which identifies what the device is and what model type it is, how many ports it has and how they are connected, and the MAC address of data has been received by each of the ports. The computer 11 interrogates the agents of each device.

The computer 11 may, on command from the selector 22, process signals from the memory 17 by the signal processor 19 and provide on the visual display unit 18 a map of the topology of the network showing each of the devices and the links therebetween. In the examples shown in FIGS. 2 and 3, the network is simple (note that the network displayed in FIG. 2 corresponds to the network shown in FIG. 1) but of course in many instances the network will be considerably more complex and it may be necessary to arrange that the visual display unit 18 only shows a simplified version or only part of the network at any one time.

In the normal mode, all of the devices in the network map shown in FIG. 2 will be displayed in the same way, that is they will be emphasised to the same extent.

In carrying out the method of the present invention, it is desired by the supervisor to determine the paths between two particular devices. In the example illustrated, it is desired to show the path between the computer 11 and workstation 12E. In the present instance there is only a single path but it will be understood that in real situations the path may not be so readily apparent and indeed there may be multiple paths between two selected devices.

Thus the network supervisor manually selects the workstations 11 and 12E by moving a cursor under the control of the mouse 22 and clicking on to the displays of the two relevant workstations (or by manually entering the ID, identifiers of the two devices via a keyboard). At this point, the signal processor 19 will act on the relevant signals and cause the visual display unit to visually distinguish, (a) the set S1 of devices and/or links forming a path between the two selected devices (set S1 comprises devices 11, 13A, 14, 13B, 12E with or without relevant links therebetween) from, (b) the other devices and links (hereafter referred to as set S2 and comprising devices 12A, 12B, 12C, 12D). That visual distinction may be one of the following:

a) The set S1 of devices and/or links may be highlighted by increasing the contrast or brightness in their images.

b) The devices and links of set S2 may be dimmed by reducing the contrast or brightness in their images. (As shown in FIG. 2)

c) The colours of either the set S1 or S2 may be changed.

d) The devices and links of set S2 may be removed from the display or map. The set S1 of devices and links which then remain may be arranged in a straight line either horizontally as shown in FIG. 3 or alternatively vertically.

In the arrangement of FIG. 2, all of the network devices and links are still maintained in the same position as when the path was not being displayed, including those which do not form part of the path.

As set out above, in a more complex network, there may be more than one path between the two selected devices and in this case, the mouse 22 may be suitably operated, for example, by clicking the cursor on a suitable icon on the screen, to select the second and subsequent paths successively. Alternatively, particularly where the selection is carried out not by mouse but by keyboard, there may be provided plural icons or an arrow arrangement so as to direct the successive views to show different selected paths.

We have described how the network may be monitored. The method of the invention may be carried out under the control of the network supervisor's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program, or may be provided on a computer or computer memory carrying the website of, for example, the supplier of the network products. The program may be downloaded from whichever appropriate source to the memory 17 of the supervisor's workstation and used to control the processor to carry out the steps of the invention as described. Particularly in the case of downloading from a website, the program will be embodied in a carrier wave received, for example, on a telephone line or other cable or by wireless, eg infra-red link.

The program may include (see FIG. 4), program step (100) for interrogating the agents of each device, program step (101) for storing information relating to the devices interrogated, program step (102) for accessing (from the memory) the information relating to the devices of the network and the links between those devices, program step (103) for converting said information into a form to provide on the visual display apparatus a display representing the devices of the network and the links between the devices, program step 104, select by the mouse or its equivalent the desired two devices, program step (105) cause said visual display apparatus to visually distinguish a set S1 of devices and/or links forming a path between the selected devices and a set S2 of the other devices and links, program step 106 on selection by the mouse or its equivalent, cause said visual display apparatus to visually distinguish on network map further sets of devices and/or links forming a path between devices selected in program step 104.

Program steps (100) and (101) may be provided by another program.

In one arrangement, program step (105) may include the following steps which will be described with reference to FIGS. 5 to 7.

Figure 5:
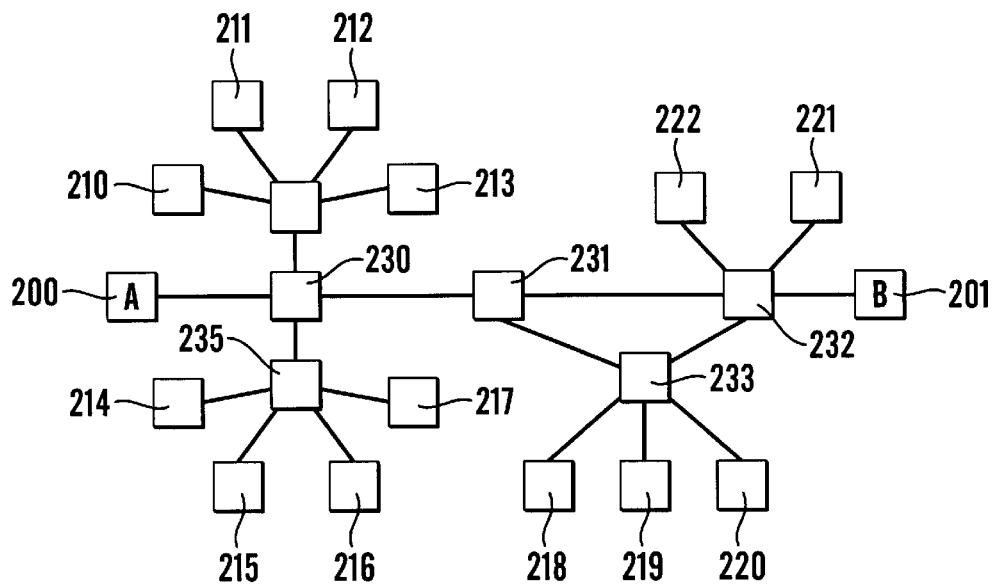
FIGS. 5 to 7 illustrate in diagrammatic form the algorithm used to carry out the method of the invention in respect of a more complex network, and, FIG. 8 sets out the detailed program steps of one of the steps of FIG. 4.

FIG. 5 shows in diagrammatic form a more complex network than that in the preceding paragraphs, the devices being numbered as shown.

Figure 4:
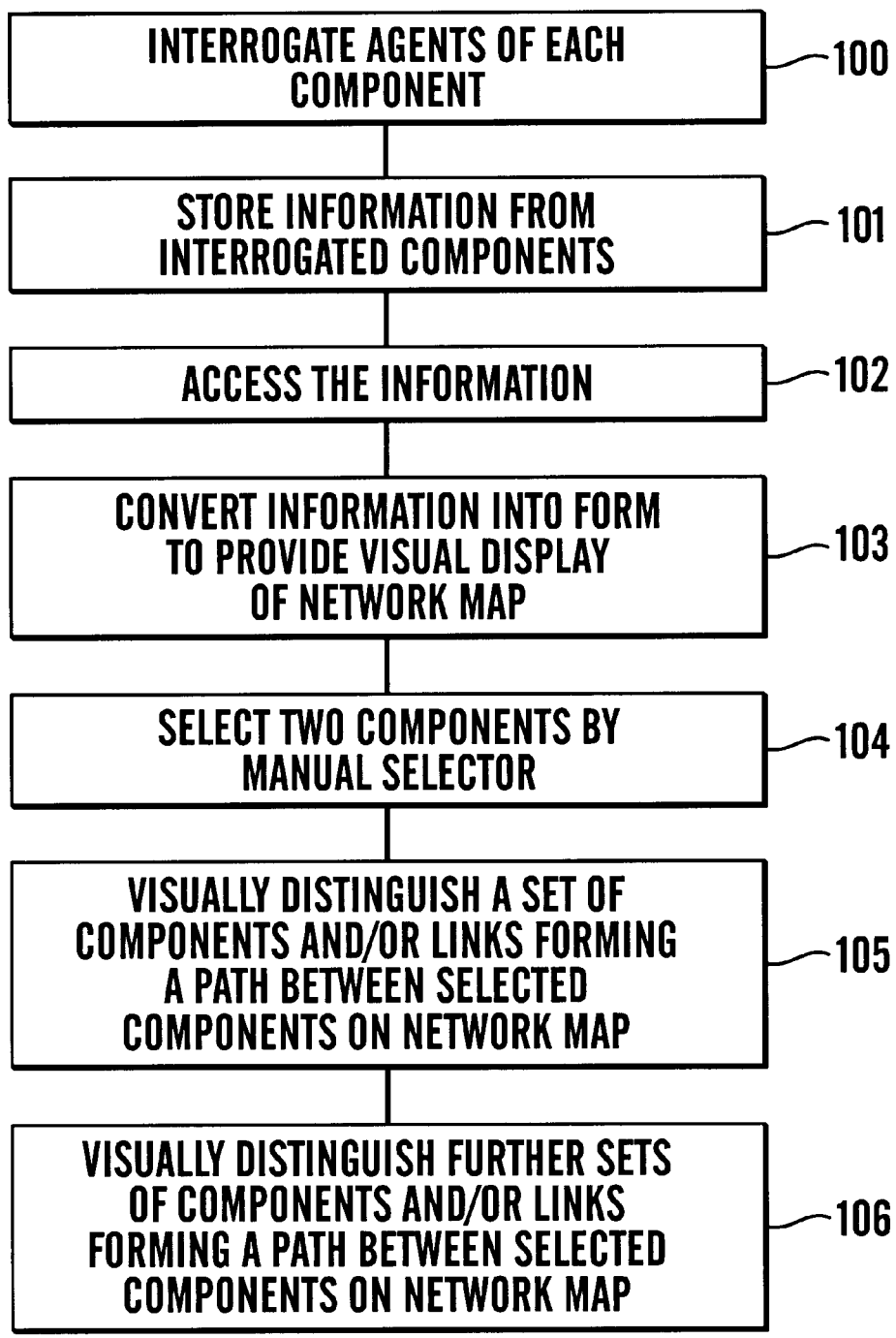
Figure 8:
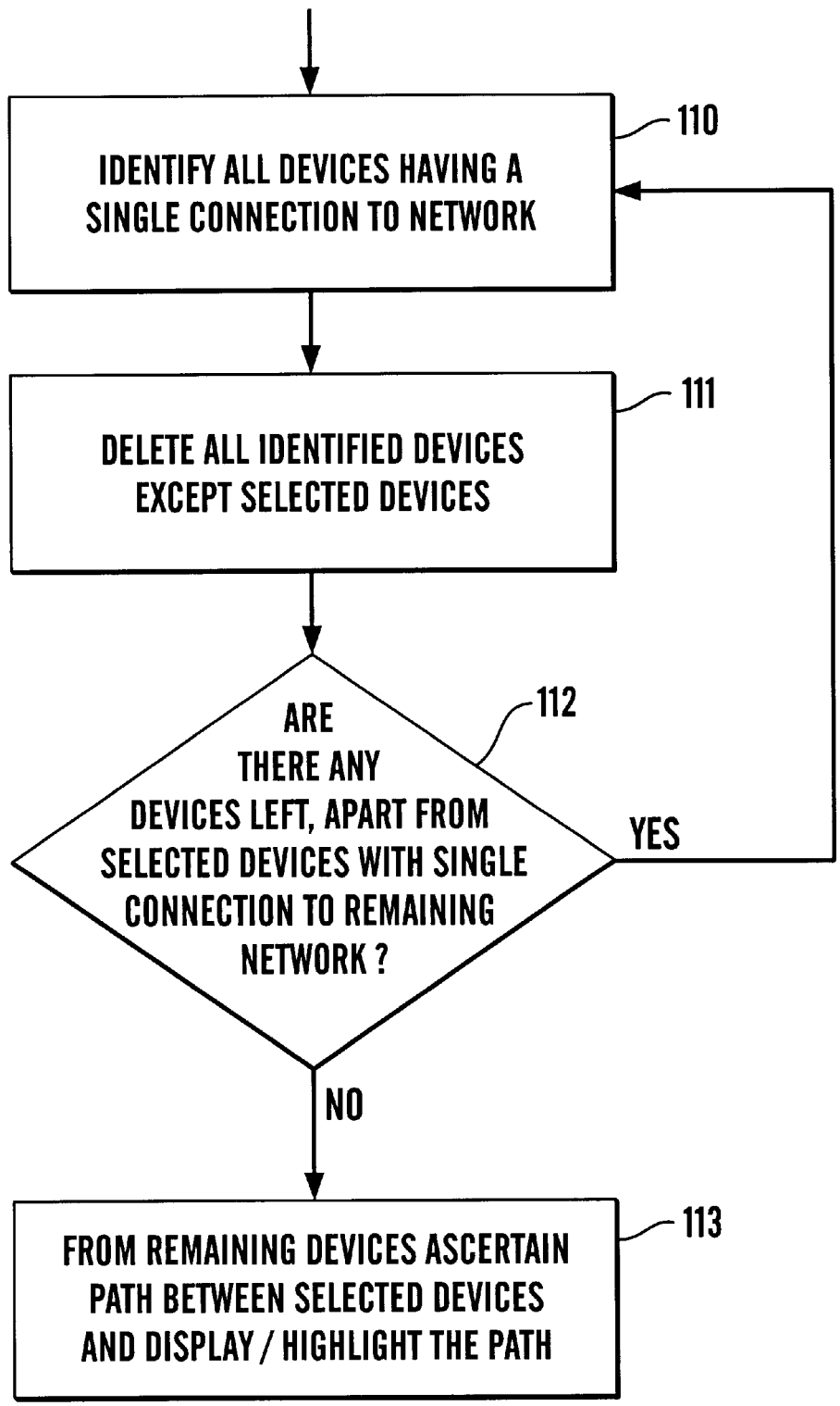

In order to trace the path between two selected devices 200, 201, the step 105 of FIG. 4 comprises the following steps, illustrated in FIG. 8:

program step 110, identify all devices having a single connection to the network ("end stations");

program step 111, delete all identified devices (except the devices selected in program step 104);

program step 112, are there any devices left (apart from devices selected in program step 104) with single connection to remaining (reduced) network?

If yes, return to program step 110;

If no, program step 113, from remaining devices, ascertain path(s) between devices selected in step 104 and display/highlight the path and then go to step 106.

Figure 6:
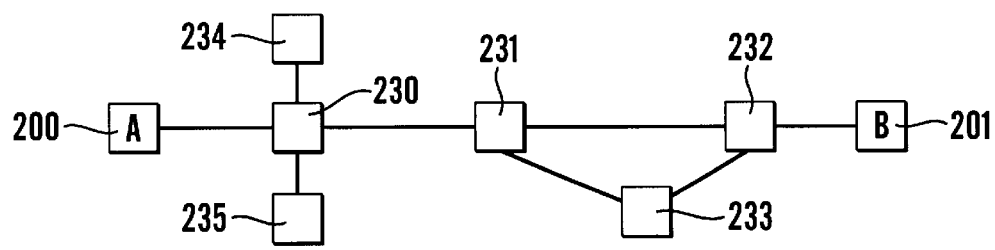

Thus referring to FIG. 5, in program step 110, the devices 210–221, 200, 201 will be identified as having a single connection to the network;

program step 111, the devices selected in step 104, that is, devices 200, 201 will be identified, and the remaining identified devices, 210–222 will be deleted to provide the situation shown in FIG. 6.

In program step 112 there remain two devices 234, 235 with a single connection to the remaining reduced network. These are deleted by a repeat of program steps 110 and 111 to provide the situation shown in FIG. 7.

At that point, in program step 112 there are no devices left having a single connection to the reduced network (apart from 200 and 201 which are selected in step 104) and so this provides a minimum network which sets out the various possible paths between the two selected devices 200, 201.

In program step 113 there may be included the following steps to ascertain all possible paths through the reduced network from one of the devices selected in step 104.

This may be carried out recursively, ie finding all possible paths starting with one selected device and including the second selected device.

Figure 7:
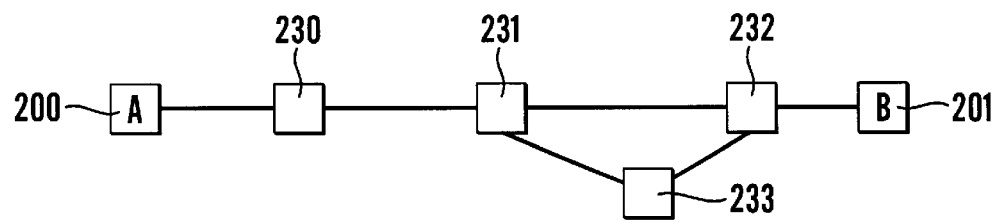

Thus for example, starting with the reduced network displayed in FIG. 7, where it is intended to find all possible paths between device 200 and device 201 the program initially ascertains all of the possible paths the following paths starting with device 200:

path 1 device 230–231–232–201 path 2 device 230–231–233–232–201

The arrangement set out above considerably reduces the amount of calculations necessary to be carried out to determine paths between two selected devices in the network. The reduction is not particularly significant in the examples set out above because of the simple nature of the network illustrated. However, in a real life situation, given a network of, say, five hundred devices, the traditional solution requires a visit to each of the five hundred devices in turn to determine whether they form part of a path connecting the two selected devices. Also, if the network contains loops (eg subnets connected by multiple routers) then the number of visits to each device increases exponentially. Thus a network containing five hundred devices and three loops would require a total of four thousand device visits for the entire network.

Even in the small network shown in FIG. 5, determining all possible paths between the devices A and B would require each device to be checked two times meaning that a total of forty two checks would need to be done.

Applying the principles set out above, the number of devices to be considered is immediately reduced to eight when shown in FIG. 6 or six in FIG. 7.

In a typical network, the initial number of end-stations, that is devices with a single link to the network, is likely to be much higher than in the examples given in FIGS. 5 to 7. Thus for example if the network had initially started with one hundred end-stations then the number of checks required will be reduced from two hundred and twelve using the prior art arrangement to twelve using the method of the invention.

Such a method of calculating and tracing the path between two devices is drastically reduced. Traditional solutions have involved starting at one of the selected devices and then recursively following every link through the network until one reached either a dead end or the selected device. As the number of devices and links increases, the time taken to determine all possible paths between any two selected devices increases significantly to a point where the user of the application may be kept waiting for a very long period of time.

The above description of the invention has been drawn with reference to a network of electronic devices. However, the principle as set out in the attached claims is applicable to other networks where a path or route needs to be determined, for example, in mazes, road maps, rail maps and games.

The invention is not restricted to the details of the foregoing example.

What is claimed is:

1. A network monitoring method for selecting a path or paths between two selected points in a network, said network comprising a plurality of points interconnected by links, comprising the steps of identifying the points of the network, deleting all points other than the selected two points having a single link to the network to produce a reduced network of points, and repeating the deletion step until there are no points connected to the network by a single link other than the two selected points.

2. A method as claimed in claim 1 in which subsequent to said repeated steps, there is provided a step for distinguishing separate paths.

3. A method as claimed in claim 2 in which said distinguishing step comprises finding all possible paths from one selected point which include the second selected point.

4. A method as claimed in claim 1 in which the topology of the network is represented by a network map on a visual display, and the paths between the selected two points are visually distinguished on said visual display.

5. A method as claimed in claim 1 in which said network comprises a network of electronic devices, and said points comprise said devices.

6. A method as claimed in claim 5 in which the topology of the network is discovered by interrogation of the agents of devices.

7. A computer program on a computer readable medium or embodied in a carrier wave for carrying out the method of claim 1.

8. Network monitoring apparatus for selecting a path or paths between two selected points in a network, said network comprising a plurality of points interconnected by links, comprising means to identify the points of the network, means to delete all points other than the selected two points having a single link to the network to produce a reduced network of points, and to repeat the deletion step until there are no points, other than the two selected points, which are connected to the network by a single link.

9. Apparatus as claimed in claim 8 including means to distinguish the separate paths which is operated subsequent to said repeated steps.

10. Apparatus as claimed in claim 8 including a visual display unit to display the topology of the network as a network map with the paths between the selected two points visually distinguished.

11. Apparatus as claimed in claim 8 in which said network comprises a network of electronic devices, and said points comprise said devices.

12. Apparatus as claimed in claim 11 including means to interrogate agents of the devices to discover the topology of the network.

* * * * *